United States Patent
Park et al.

(10) Patent No.: US 9,970,688 B2
(45) Date of Patent: May 15, 2018

(54) REGENERATIVE AIR-CONDITIONING APPARATUS AND METHOD OF CONTROLLING THE SAME

(71) Applicant: LG Electronics Inc., Seoul (KR)

(72) Inventors: Heewoong Park, Seoul (KR); Noma Park, Seoul (KR); Seunghyun Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 238 days.

(21) Appl. No.: 14/712,102

(22) Filed: May 14, 2015

(65) Prior Publication Data
US 2016/0003499 A1    Jan. 7, 2016

(30) Foreign Application Priority Data

Jul. 7, 2014 (KR) .................. 10-2014-0084386

(51) Int. Cl.
*F25B 13/00* (2006.01)
*F25B 49/02* (2006.01)
(Continued)

(52) U.S. Cl.
CPC ............ *F25B 13/00* (2013.01); *F25B 41/003* (2013.01); *F25B 41/04* (2013.01); *F25B 49/02* (2013.01);
(Continued)

(58) Field of Classification Search
CPC ........ F25B 13/00; F25B 41/003; F25B 41/04; F25B 49/02; F25B 2400/24; F25B 2313/02742; F25B 2313/021
(Continued)

(56) References Cited

U.S. PATENT DOCUMENTS 4,065,938 A * 1/1978 Jonsson .................. F24F 3/001
                                                    237/2 B
4,149,389 A * 4/1979 Hayes ....................... F25B 7/00
                                                    62/114
(Continued)

FOREIGN PATENT DOCUMENTS

CN     1294672 A    5/2001
CN     1511243 A    7/2004
(Continued)

*Primary Examiner* — Len Tran
*Assistant Examiner* — Kirstin Oswald
(74) *Attorney, Agent, or Firm* — Birch, Stewart, Kolasch & Birch, LLP

(57) ABSTRACT

A regenerative air-conditioning apparatus includes a thermal energy storage unit, first and second valve devices for switching a flow direction of a refrigerant compressed in a compressor, a first branch part disposed on an outlet-side of the compressor, the first branch dividing the refrigerant compressed in the compressor to flow into first and second valve devices or the thermal energy storage unit, a first storage unit connection tube extending from the first branch part to the thermal energy storage unit, a condensed refrigerant tube extending from an outdoor heat exchanger to an indoor heat exchanger, a second storage unit connection tube extending from the thermal energy storage unit to the condensed refrigerant tube, and a first expansion device disposed in the first storage unit connection tube to selectively restrict a flow of the refrigerant from the first branch part to the thermal energy storage unit.

13 Claims, 11 Drawing Sheets

(51) Int. Cl.
  *F25B 41/00* (2006.01)
  *F25B 41/04* (2006.01)
(52) U.S. Cl.
  CPC ............ *F25B 2313/021* (2013.01); *F25B 2313/02742* (2013.01); *F25B 2400/24* (2013.01)
(58) Field of Classification Search
  USPC ........................................ 62/115, 160, 430
  See application file for complete search history.

(56) References Cited

U.S. PATENT DOCUMENTS

| | | | | |
|---|---|---|---|---|
| 4,893,476 | A * | 1/1990 | Bos | F24D 11/0214 62/238.6 |
| 4,964,279 | A * | 10/1990 | Osborne | F25D 16/00 62/201 |
| 5,251,455 | A * | 10/1993 | Cur | F25B 5/02 62/199 |
| 5,307,642 | A * | 5/1994 | Dean | F24F 5/0017 62/201 |
| 5,497,629 | A * | 3/1996 | Rafalovich | F24D 11/0214 62/199 |
| 2001/0047662 | A1 * | 12/2001 | Takao | C09K 5/066 62/430 |
| 2004/0112082 | A1 | 6/2004 | Tanimoto et al. | |
| 2008/0236185 | A1 * | 10/2008 | Choi | F25B 7/00 62/332 |
| 2008/0282728 | A1 * | 11/2008 | Takegami | F25B 1/10 62/498 |
| 2009/0282848 | A1 * | 11/2009 | Takegami | F25B 13/00 62/222 |
| 2010/0139312 | A1 * | 6/2010 | Takegami | F25B 13/00 62/498 |
| 2011/0011119 | A1 * | 1/2011 | Kuehl | F25D 16/00 62/434 |
| 2013/0312443 | A1 | 11/2013 | Tamaki et al. | |
| 2014/0298855 | A1 | 10/2014 | Kang et al. | |

FOREIGN PATENT DOCUMENTS

| | | |
|---|---|---|
| CN | 103370584 A | 10/2013 |
| CN | 103842733 A | 6/2014 |
| EP | 2767773 A1 | 8/2014 |
| JP | 2-29560 A | 1/1990 |
| JP | 4-187951 A | 7/1992 |
| JP | 7-4721 A | 1/1995 |
| JP | 2508812 B2 | 6/1996 |
| JP | 2002-267236 A | 9/2002 |
| JP | 2002267236 A * | 9/2002 |
| JP | 2003-336868 A | 11/2003 |
| JP | 2006-29637 A | 2/2006 |
| JP | 2007-17089 A | 1/2007 |
| KR | 10-2007-0019274 A | 2/2007 |
| KR | 10-2013-0044889 A | 5/2013 |
| KR | 10-1325319 B1 | 10/2013 |
| WO | WO 00/33002 A1 | 6/2000 |
| WO | WO 2012/111063 A1 | 8/2012 |
| WO | WO 2013/046720 A | 4/2013 |

* cited by examiner

REGENERATIVE AIR-CONDITIONING APPARATUS AND METHOD OF CONTROLLING THE SAME

CROSS-REFERENCE TO RELATED APPLICATIONS

The present application claims priority under 35 U.S.C. 119 to Korean Patent Application No. 10-2014-0084386, filed on Jul. 7, 2014, which is hereby incorporated by reference in its entirety.

BACKGROUND

The present disclosure relates to a regenerative air-conditioner apparatus and a method of controlling the same.

Air-conditioning apparatuses are apparatuses for cooling or heating an indoor space by heat-exchanging a refrigerant flowing into a heat-exchange cycle with outdoor air.

In detail, such an air-conditioning apparatus includes a compressor for compressing a refrigerant, an outdoor heat exchanger in which the refrigerant exchanges heat with outdoor air, and an indoor heat exchanger in which the refrigerant exchanges heat with indoor air.

The air-conditioning apparatus may include a heat accumulation bath. Thus, this air-conditioning apparatus is called a "regenerative air-conditioning apparatus". The heat accumulation bath includes a case defining an exterior thereof and a heat storage medium filled into the case. The refrigerant may exchange heat with the heat storage medium while passing through the heat accumulation bath. In this process, heat may be accumulated into the heat storage medium or be radiated from the heat storage medium. Thus, cold (cold energy) or heat may be stored in the heat storage medium.

For example, the air-conditioning apparatus may store cold energy or heat in the heat accumulation bath by using inexpensive midnight electricity. Thus, when an electric fee is expensive, or power is lacking, the air-conditioning apparatus may perform cooling or heating by using the cold energy or heat that is stored in the heat accumulation bath.

According to prior patent document Registration Number 10-1325319, a control method is complicated, and power consumption is high. Also, in the regenerative air-conditioning apparatus according to the prior patent document, it may be difficult to perform a defrosting operation when the heating operation is performed.

SUMMARY

Embodiments provide a regenerative air-conditioning apparatus that is capable of operating by using dual heat sources and dual loads through a thermal energy storage unit, such as a heat accumulation bath.

In one embodiment, a regenerative air-conditioning apparatus including a compressor, an outdoor heat exchanger, an indoor heat exchanger, and a heat storage bath, includes first and second valve devices for switching a flow direction of a refrigerant compressed in the compressor; a first branch part disposed on an outlet-side of the compressor, the first branch dividing the refrigerant compressed in the compressor to flow into first and second valve devices or the heat storage bath; a first storage bath connection tube extending from the first branch part to the heat storage bath; a condensed refrigerant tube extending from the outdoor heat exchanger to the indoor heat exchanger; a second storage bath connection tube extending from the heat storage bath to the condensed refrigerant tube; and a first expansion device disposed in the first storage bath connection tube to selectively restrict a flow of the refrigerant from the first branch part to the heat storage bath.

The regenerative air-conditioning apparatus may further include a second expansion device disposed in the second storage bath connection tube to selectively restrict a flow of the refrigerant into the heat storage bath or a flow of the refrigerant discharged from the heat storage bath.

The regenerative air-conditioning apparatus may further include a low-pressure tube extending from the first storage connection tube to a suction-side of the compressor to allow the evaporated refrigerant to flow therethrough; and a flow rate adjustment valve disposed in the low-pressure tube to selectively restrict a flow of the refrigerant in the low-pressure tube.

The heat storage bath may include a case defining an exterior; an inner tube disposed in the case to allow the refrigerant to flow therethrough; and a thermal energy storage medium filled into the case.

The thermal energy storage medium may include a solid-liquid slurry obtained by cooling a tetra n-butyl ammonium bromide $[(CH_3(CH_2)_3]_4NBr$ (TBAB) solution that is a mixture of water and TBAB.

The regenerative air-conditioning apparatus may further include a second branch part at which the second storage bath connection tube and the condensed refrigerant tube are combined with each other.

The first or second valve device may include a four-way valve.

The regenerative air-conditioning apparatus may further include a first connection tube guiding the refrigerant compressed in the compressor into the first valve device; a second connection tube guiding the refrigerant introduced into the first valve device through the first connection tube into the outdoor heat exchanger when a cooling operation is performed; a third connection tube extending form the first valve device to the low-pressure tube; and a fourth connection tube guiding the refrigerant introduced into the first valve device through the first connection tube into the indoor heat exchanger.

The regenerative air-conditioning apparatus may further include a fifth connection tube guiding the refrigerant compressed in the compressor into the second valve device; a sixth connection tube guiding the refrigerant introduced into the second valve device through the fifth connection tube into the outdoor heat exchanger when the cooling operation is performed; a seventh connection tube extending from the second valve device to the low-pressure tube; and an eighth connection tube guiding the refrigerant introduced into the second valve device through the fifth connection tube into the indoor heat exchanger.

The regenerative air-conditioning apparatus may further include a third branch part at which the second connection tube and the sixth connection tube are combined with each other.

The fourth connection tube may have one side connected to one point of the eighth connection tube.

The first or second expansion device may include an electronic expansion valve.

In another embodiment, a method of controlling a regenerative air-conditioning apparatus including a compressor, first and second valve devices, an outdoor heat exchanger, an indoor heat exchanger, a condensed refrigerant tube connecting the outdoor heat exchanger to the indoor heat exchanger, and a heat storage bath. includes determining an operation mode of the first and second valve devices according to an operation mode of the regenerative air-conditioning apparatus; selectively restricting a flow of refrigerant by using a first expansion device disposed in a first storage bath connection tube extending from the compressor to the heat storage bath; and selectively restricting a flow of the refrigerant by using a second expansion device disposed in a second storage bath connection tube extending from the heat storage bath to the condensed refrigerant tube, wherein, in a heat accumulation or radiation heating operation mode of the regenerative air-conditioning apparatus, at least one of the outdoor heat exchanger, the indoor heat exchanger, and the heat storage bath serves as a condenser, and the rest serves as an evaporator.

In a cold energy accumulation or discharge cooling operation mode of the regenerative air-conditioning apparatus, at least one of the outdoor heat exchanger, the indoor heat exchanger, and the heat storage bath may serve as a condenser, and the rest may serve as an evaporator.

When the first expansion device is opened, at least one portion of the refrigerant compressed in the compressor may be introduced into the heat storage bath through the first storage bath connection tube.

In the heat accumulation heating operation mode or cold energy discharge cooling operation mode of the regenerative air-conditioning apparatus, the second expansion device may be opened to introduce the refrigerant condensed in the heat storage bath into the condensed refrigerant tube, and in the heat radiation heating operation mode or cold energy accumulation cooling operation mode of the regenerative air-conditioning apparatus, the second expansion device may be opened by a preset opening degree to decompress the refrigerant.

When the regenerative air-conditioning apparatus performs the cooling operation mode, the operation mode of the first and second valve devices may include a first operation mode in which a first connection tube and a second connection tube of the first valve device communicate with each other, and a third connection tube and a fourth connection tube of the first valve device communicate with each other, and a fifth connection tube and a sixth connection tube of the second valve device communicate with each other, and a seventh connection tube and an eighth connection tube of the second valve device communicate with each other.

When the regenerative air-conditioning apparatus performs the heat accumulation or radiation heating operation mode, the operation mode of the first and second valve devices may include a second operation mode in which the first connection tube and the fourth connection tube of the first valve device communicate with each other, and the second connection tube and the third connection tube of the first valve device communicate with each other, and the fifth connection tube and the eighth connection tube of the second valve device communicate with each other, and the sixth connection tube and the seventh connection tube of the second valve device communicate with each other.

When the regenerative air-conditioning apparatus performs a defrosting heating operation mode, the operation mode of the first and second valve devices may include a third operation mode in which the first connection tube and the second connection tube of the first valve device communicate with each other, and the third connection tube and the fourth connection tube of the first valve device communicate with each other, and the fifth connection tube and the eighth connection tube of the second valve device communicate with each other, and the sixth connection tube and the seventh connection tube of the second valve device communicate with each other.

The details of one or more embodiments are set forth in the accompanying drawings and the description below. Other features will be apparent from the description and drawings, and from the claims.

DETAILED DESCRIPTION OF THE EMBODIMENTS

Hereinafter, exemplary embodiments will be described with reference to the accompanying drawings. The invention may, however, be embodied in many different forms and should not be construed as being limited to the embodiments set forth herein; rather, that alternate embodiments included in other retrogressive inventions or falling within the spirit and scope of the present disclosure will fully convey the concept of the invention to those skilled in the art.

Figure 1:
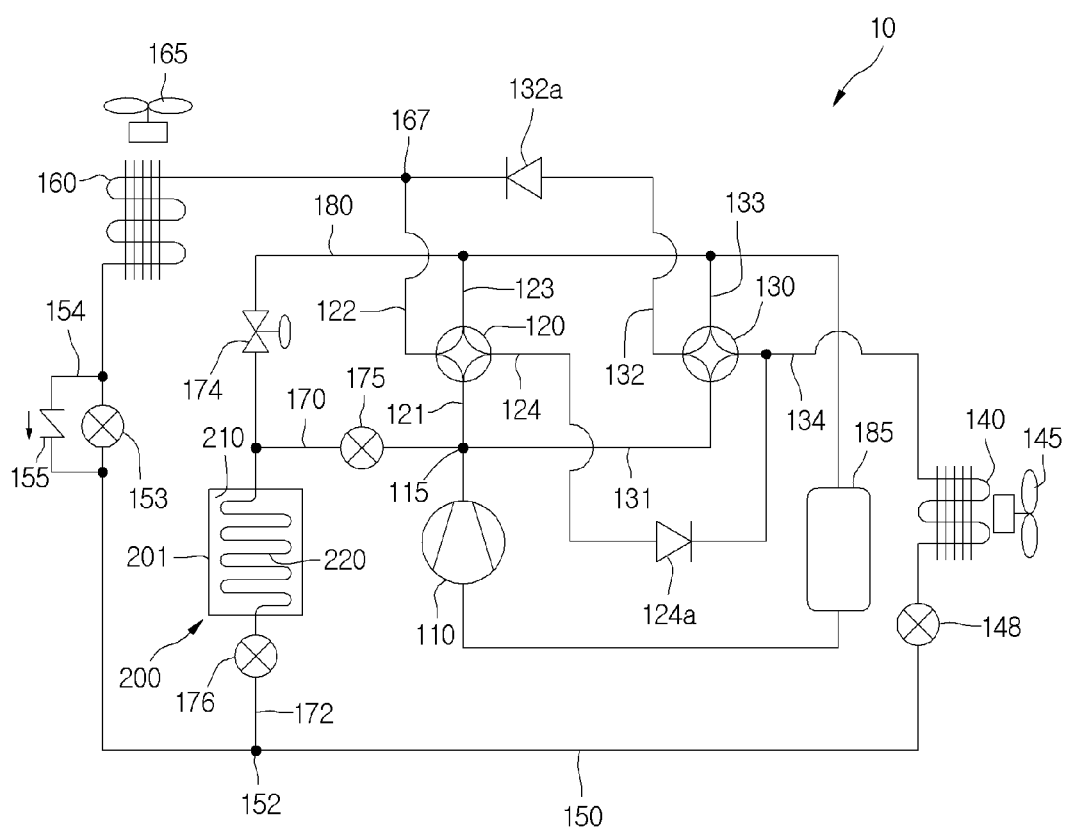
FIG. 1 is a system view of a regenerative air-conditioning apparatus according to a first embodiment.

FIG. 1 is a system view of a regenerative air-conditioning apparatus according to a first embodiment.

Referring to FIG. 1, a regenerative air-conditioning apparatus 10 (hereinafter, referred to an air-conditioning apparatus) according to a first embodiment includes a compressor 110 for compressing a refrigerant and first and second valve devices 120 and 130 for switching a flow direction of the refrigerant compressed in the compressor 110. The first and second valve devices 120 and 130 are connected in parallel to each other at an outlet-side of the compressor 110.

A gas/liquid separator 185 is disposed at a suction-side of the compressor 110 for separating a gaseous portion of the refrigerant from a gas/liquid mixture of refrigerant, in order to supply only the gaseous refrigerant into the compressor 110.

The air-conditioning apparatus 10 includes a first branch part 115 disposed between the compressor 110 and the first and second valve devices 120 and 130 to divide the refrigerant compressed in the compressor 110 to flow into the first and second valve devices 120 and 130 or a first expansion device 175 that will be described later.

The air-conditioning apparatus 10 includes a first connection tube 121 extending from the first branch part 115 to the first valve device 120 and a fifth connection tube 131 extending from the first branch part 115 to the second valve device 130. The first connection tube 121 may be understood as an inflow tube of the first valve device 120, and the fifth connection tube 131 may be understood as an inflow tube of the second valve device 130.

Each of the first and second valve devices 120 and 130 may include a four way valve having one inflow part and three discharge parts.

The air-conditioning apparatus further include three connection tubes 122, 123, and 124 connected to the first valve device 120. The three connection tubes 122, 123, and 124 include a second connection tube 122, a third connection tube 123, and a fourth connection tube 124.

The first valve device 120 may operate to allow the refrigerant introduced into the first valve device 120 through the first connection tube 121 to be discharged into one connection tube of the second to fourth connection tubes 122, 123, and 124.

The air-conditioning apparatus 10 further includes three connection tubes 132, 133, and 134 connected to the second valve device 130. The three connection tubes 132, 133, and 134 include a sixth connection tube 132, a seventh connection tube 133, and an eighth connection tube 134.

The second valve device 130 may operate to allow the refrigerant introduced into the second valve device 130 through the fifth connection tube 131 to be discharged into one connection tube of the sixth to eighth connection tubes 132, 133, and 134.

The air-conditioning apparatus 10 further includes a third branch part 167 connected to the second connection tube 122 and the sixth connection tube 132. Thus, the refrigerant of the second connection tube 122 and the refrigerant of the sixth connection tube 132 may be mixed with each other in the third branch part 167.

A second check valve 132a may be disposed in the sixth connection tube 132. The second check valve 132a guides a flow of the refrigerant from the second valve device 130 to the third branch part 167 and restricts an opposite flow of the refrigerant, i.e., a flow from the third branch part 167 to the second valve device 130.

The fourth connection tube 124 may have one side connected to one point of the eighth connection tube 134. The refrigerant of the fourth connection tube 124 may be mixed with the refrigerant of the eighth connection tube 134 and then introduced into the indoor heat exchanger 140.

A first check valve 124a may be disposed in the fourth connection tube 124. The first check valve 124a guides a flow of the refrigerant from the first valve device 120 to the eighth connection tube 134 and restricts an opposite flow of the refrigerant, i.e., a flow from the eighth connection tube 134 to the first valve device 120.

The third connection tube 123 and the seventh connection tube 133 may be connected to a low-pressure tube 180 that will be described later.

The air-conditioning apparatus 10 further include an indoor heat exchanger 140 in which the refrigerant exchanges heat with indoor air and an indoor fan 145 disposed on one side of the indoor heat exchanger 140 to generate an air flow. The indoor heat exchanger 140 may be connected to the eighth connection tube 134.

The air-conditioning apparatus 10 further include an outdoor heat exchanger 160 in which the refrigerant exchanges heat with outdoor air and an outdoor fan 165 disposed on one side of the outdoor heat exchanger 160 to generate an air flow. A tube extending from the third branch part 167 to the outdoor heat exchanger 160 may be connected to the outdoor heat exchanger 160.

The air-conditioning apparatus 10 further include a condensed refrigerant tube 150 extending from the indoor heat exchanger 140 to the outdoor heat exchanger 160. The condensed refrigerant tube 150 is disposed between the indoor heat exchanger 140 and the outdoor heat exchanger 160. An indoor expansion device 148 and a main expansion device 153 may be disposed in the condensed refrigerant tube 150.

The indoor expansion device 148 together with the indoor heat exchanger 140 may be disposed within the indoor unit. The indoor expansion device 148 may decompress the refrigerant when the air-conditioning apparatus performs the cooling operation. Also, the main expansion device 153 may decompress the refrigerant when the air-conditioning apparatus performs the heating operation.

The air-conditioning apparatus 10 further include a bypass tube 154 connected to the condensed refrigerant tube 150 to allow the refrigerant to bypass the main expansion device 153, and a bypass check valve 155 disposed in the bypass tube 154 to guide the refrigerant of the bypass tube 154 in one direction. The bypass tube 154 may have one side connected to one point of the condensed refrigerant tube 150 and the other side connected to the other point of the condensed refrigerant tube 150.

When the air-conditioning apparatus 10 performs the cooling operation, at least one portion of the refrigerant passing through the outdoor heat exchanger 160 may bypass the main expansion device 153 to flow into the bypass tube 154. On the other hand, when the air-conditioning apparatus 10 performs the heating operation, the flow of the refrigerant into the bypass tube 154 may be restricted by the bypass check valve 155.

The air-conditioning apparatus 10 further includes a heat storage bath 200 acting as a thermal energy storage unit for storing heat energy or cold energy of the refrigerant and radiating the stored heat energy or cold energy. The heat storage bath 200 may function as a condenser or evaporator according to an operation mode of the air-conditioning apparatus.

The heat storage bath 200 includes a case 201 defining an exterior thereof, a thermal energy storage medium 210, sometimes referred to as a heat storage medium, filled into the case 201, and an inner tube 220 disposed in the case 201 to allow the refrigerant to flow therethrough. The inner tube 220 may be bent several times within the case 201. Thus, a heat-exchange area between the refrigerant flowing into the inner tube 220 and the thermal energy storage medium 210 may increase.

The thermal energy storage medium 210 may exchange heat with the refrigerant flowing into the inner tube 220 to store the cold energy or heat energy. If the thermal energy storage medium 210 stores the heat energy, the heat storage bath 200 may be called a "heat accumulation bath", and the thermal energy storage medium 210 may be called a "heat accumulation material". If the thermal energy storage medium 210 stores the cold energy, the heat storage bath 200 may be called a "cold energy accumulation bath", and the thermal energy storage medium 210 may be called a "cold energy accumulation material".

The thermal energy storage medium 210 includes a phase change material (PCM) that changes in phase during the heat-exchange process to store/release heat. The phase change material may include a slurry of tetra n-butyl ammonium bromide, $[(CH_3(CH_2)_3]_4NBr$ (TBAB).

The slurry TBAB may be solid-liquid slurry obtained by cooling a TBAB solution that is a mixture of water and TBAB. The slurry TBAB has a phase change temperature of about 5° C. to about 12° C.

The slurry TBAB may have a phase change temperature greater than that of water (about 0° C.) to improve the heat or cold energy accumulation function.

The air-conditioning apparatus 10 further includes a first storage bath connection tube 170 extending from the first branch part 115 to the heat storage bath 200 and a second storage bath connection tube 172 extending from the heat storage bath 200 to the condensed refrigerant tube 150.

Also, the air-conditioning apparatus 10 further includes a second branch part 152 connected to the second storage bath connection tube 172 and the condensed refrigerant tube 150. Thus, according to the operation mode of the air-conditioning apparatus 10, the refrigerant of the second storage bath connection tube 172 may flow into the condensed refrigerant tube 150 through the second branch part 152, or the refrigerant of the condensed refrigerant tube 150 may flow into the second storage bath connection tube 172 through the second branch part 152.

The first expansion device 175 may be disposed in the first storage bath connection tube 170. The first expansion device 175 may include an electronic expansion valve (EEV) of which an opening degree is adjustable. For example, the first expansion device 175 may be opened or closed according to the operation mode of the air-conditioning apparatus 10 to adjust a flow of the refrigerant.

A second expansion device 176 may be disposed in the second storage bath connection tube 172. The second expansion device 176 may include an EEV of which an opening degree is adjustable. For example, the second expansion device 176 may be opened or closed according to the operation mode of the air-conditioning apparatus 10 to adjust a flow of the refrigerant or decompress the refrigerant.

The air-conditioning apparatus 10 further include a low-pressure tube 180 extending from the first storage bath connection tube 170 to a suction-side of the compressor 110, i.e., extending to an inlet-side of the gas/liquid separator 185. The low-pressure tube 180 may be understood as a tube through which the low-pressure refrigerant flows in the refrigeration cycle. The refrigerant of the low-pressure tube 180 may be introduced into the gas/liquid separator 185 to separate a gaseous refrigerant from the refrigerant. The separated gaseous refrigerant may be suctioned into the compressor 110.

A flow rate adjustment valve 174 for adjusting a flow rate of the refrigerant flowing into the low-pressure tube 180 may be disposed in the low-pressure tube 180. For example, the flow rate adjustment valve 174 may include an on/off-controllable solenoid valve or an opening degree-adjustable EEV.

Hereinafter, a flow of the refrigerant according to the operation mode of the air-conditioning apparatus will be described with reference to the accompanying drawings.

Figure 2:
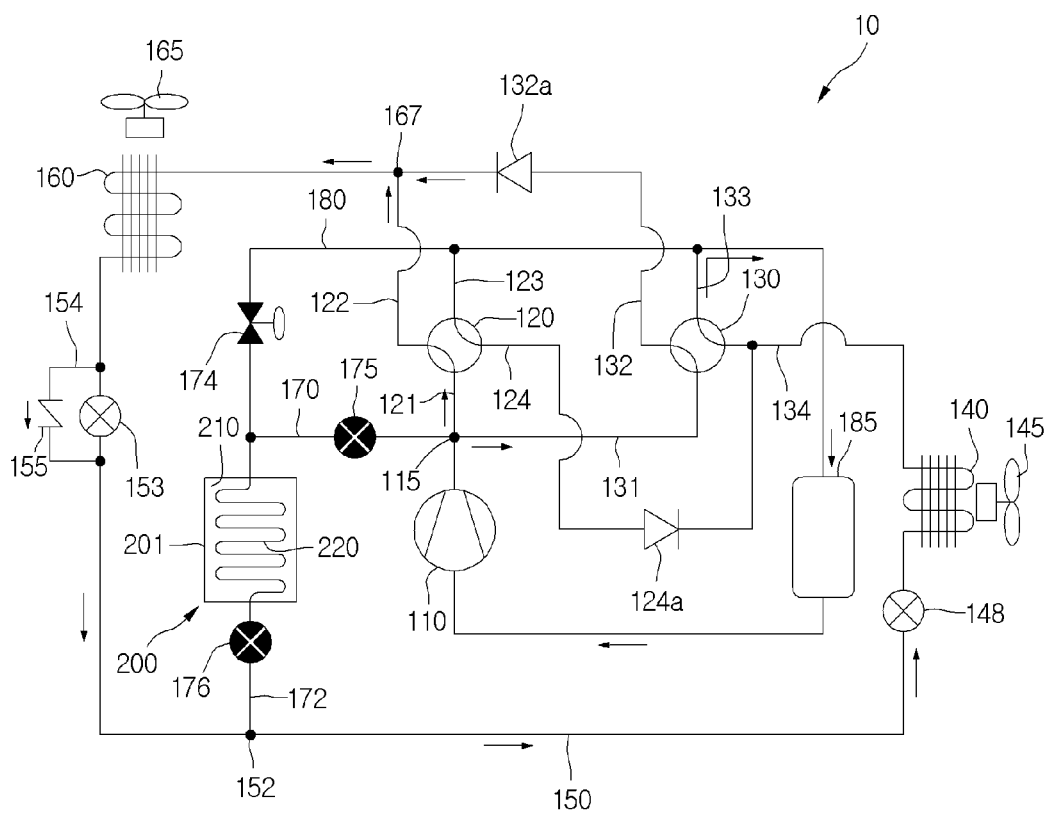
FIG. 2 is a system view illustrating a flow of a refrigerant when a normal cooling operation of the regenerative air-conditioning apparatus is performed according to the first embodiment.

FIG. 2 is a system view illustrating a flow of the refrigerant when a normal cooling operation of the regenerative air-conditioning apparatus is performed according to the first embodiment.

When the air-conditioning apparatus 10 performs the cooling operation (a normal cooling operation, a cold energy accumulation cooling operation, and a cold energy discharge operation), each of the first and second valve devices 120 and 130 may operate in a "first operation mode".

When the first valve device 120 operates in the first operation mode, the first and second connection tubes 121 and 122 communicate with each other, and the third and fourth connection tubes 123 and 124 communicate with each other.

Also, when the second valve device 130 operates in the first operation mode, the fifth connection tube 131 and the sixth connection tube 132 communicate with each other, and the seventh connection tube 133 and the eighth connection tube 134 communicate with each other.

Referring to FIG. 2, the refrigerant compressed in the compressor 110 is divided to flow into the first and second valve devices 120 and 130 at the first branch part 115. Here, the first expansion device 175 is closed to restrict a flow of the refrigerant from the first branch part 115 to the first storage bath connection tube 170.

That is, at least one portion of the compressed refrigerant is introduced into the first connection tube 121 of the first valve device 120 and then is discharged into the second connection tube 122 of the first valve device 120. Also, the remaining portion of the compressed refrigerant is introduced into the fifth connection tube 131 of the second valve device 130 and then is discharged into the sixth connection tube 132 of the second valve device 130.

The refrigerant of the second connection tube 122 and the refrigerant of the sixth connection tube 132 may be mixed with each other in the third branch part 167 and then be introduced into the outdoor heat exchanger 160 and be condensed in the outdoor heat exchanger 160.

The refrigerant condensed in the outdoor heat exchanger 160 flows into the condensed refrigerant tube 150. Here, the main expansion device 153 may be fully opened to allow the refrigerant to pass therethrough. Also, at least one portion of the refrigerant of the condensed refrigerant tube 150 may flow into the bypass tube 154 to bypass the main expansion device 153. Thus, pressure drop in the main expansion device 153 may be prevented.

The second expansion device 176 may be closed. Thus, a flow of the refrigerant of the condensed refrigerant tube 150 into the second storage bath connection tube 172 may be restricted to allow the refrigerant to flow toward the indoor heat exchanger 140. Before the refrigerant is introduced into the indoor heat exchanger 140, the refrigerant may be decompressed while passing through the indoor expansion device 148. Here, the indoor expansion device 148 may be opened by a predetermined opening degree that is enough to decompress the refrigerant.

The refrigerant may be evaporated while passing through the indoor heat exchanger 140, and the evaporated refrigerant may be introduced into the eighth connection tube 134 of the second valve device 130 and then be discharged into the seventh connection tube 133. The refrigerant of the seventh connection tube 133 flows into the low-pressure tube 180 and then be introduced into the gas/liquid separator 185.

A gaseous refrigerant of the refrigerant introduced into the gas/liquid separator 185 may be separated, and the separated gaseous refrigerant may be suctioned into the compressor 110. Then, the refrigerant cycle may be repeatedly performed.

Figure 3:
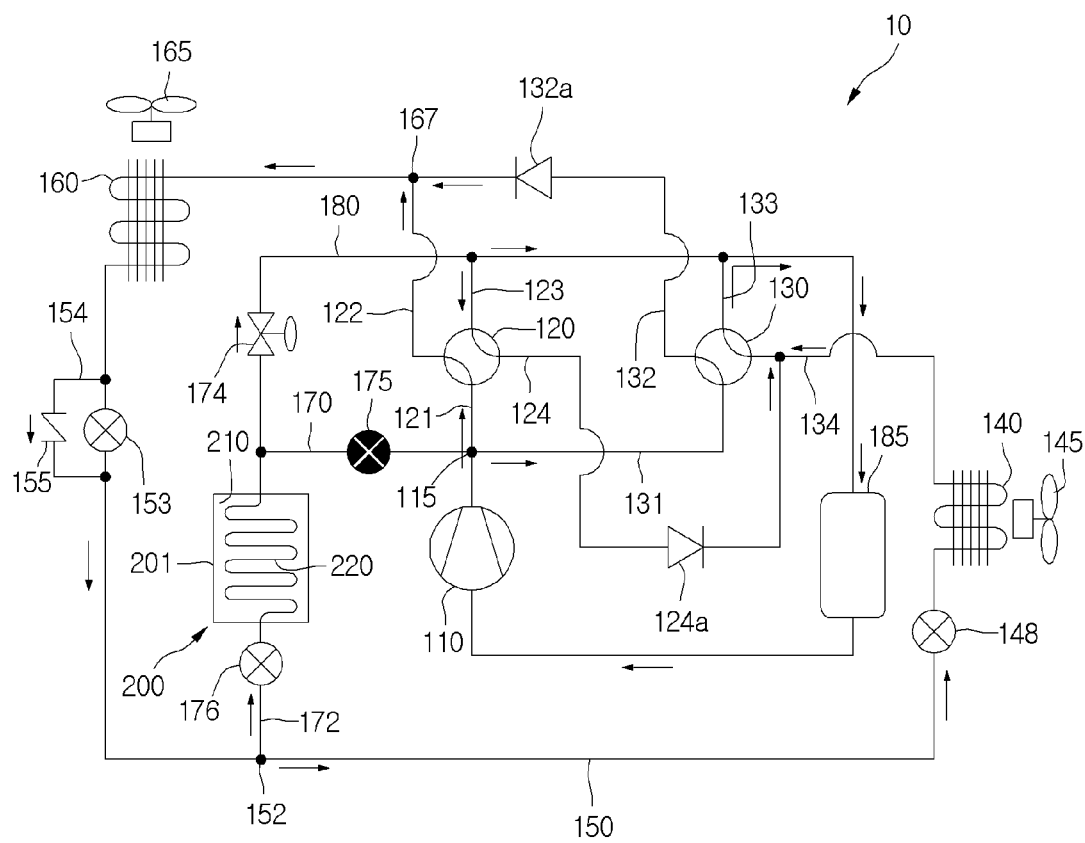
FIG. 3 is a system view illustrating a flow of the refrigerant when a heat accumulation cooling operation of the regenerative air-conditioning apparatus is performed according to the first embodiment.

FIG. 3 is a system view illustrating a flow of the refrigerant when the heat accumulation cooling operation of the regenerative air-conditioning apparatus is performed according to the first embodiment.

Referring to FIG. 3, the refrigerant compressed in the compressor 110 is divided to flow into the first and second valve devices 120 and 130 at the first branch part 115. Here, the first expansion device 175 is closed to restrict a flow of the refrigerant from the first branch part 115 to the first storage bath connection tube 170.

That is, at least one portion of the compressed refrigerant is introduced into the first connection tube 121 of the first valve device 120 and then is discharged into the second connection tube 122 of the first valve device 120. Also, the remaining portion of the compressed refrigerant is introduced into the fifth connection tube 131 of the second valve device 130 and then is discharged into the sixth connection tube 132 of the second valve device 130.

The refrigerant of the second connection tube 122 and the refrigerant of the sixth connection tube 132 may be mixed with each other in the third branch part 167 and then be introduced into the outdoor heat exchanger 160 and be condensed in the outdoor heat exchanger 160.

The refrigerant condensed in the outdoor heat exchanger 160 flows into the condensed refrigerant tube 150. Here, the main expansion device 153 may be fully opened to allow the refrigerant to pass therethrough. Also, at least one portion of the refrigerant of the condensed refrigerant tube 150 may flow into the bypass tube 154 to bypass the main expansion device 153.

The second expansion device 176 is opened to guide at least one portion of the refrigerant of the condensed refrigerant tube 150 into the second storage bath connection tube 172. Here, the second expansion device 176 may be opened by a predetermined opening degree that is enough to decompress the refrigerant.

The refrigerant decompressed in the second expansion device 176 may be introduced into the heat storage bath 200 and then be evaporated while exchanging heat with the thermal energy storage medium 210. Also, while the refrigerant is evaporated, the thermal energy storage medium 210 may change in phase into a solid state to storage cold energy.

The refrigerant of the condensed refrigerant tube 150 except for the refrigerant flowing into the second storage bath connection tube 172 is decompressed in the indoor expansion device 148 and is evaporated in the indoor heat exchanger 140. The refrigerant condensed in the indoor heat exchanger 140 flows into the eighth connection tube 134.

That is, when the heat accumulation cooling operation is performed, the outdoor heat exchanger 160 functions as the condenser, and the heat storage bath 200 and the indoor heat exchanger 140 function as the evaporator. Thus, the air-conditioning apparatus 10 may operate by using dual loads.

The refrigerant evaporated in the heat storage bath 200 is introduced into the gas/liquid separator 185 via the low-pressure tube 180. Here, the flow rate adjustment valve 174 is turned on or opened to guide a flow of the refrigerant into the low-pressure tube 180.

At least one portion of the refrigerant of the low-pressure tube 180 is introduced into the first valve device 120 through the third connection tube 123 and then is discharged through the fourth connection tube 124. Also, the refrigerant flows into the eighth connection tube 134 and then is mixed with the refrigerant passing through the indoor heat exchanger 140 and is introduced into the gas/liquid separator 185.

A gaseous refrigerant of the refrigerant introduced into the gas/liquid separator 185 may be separated, and the separated gaseous refrigerant may be suctioned into the compressor 110. Then, the refrigerant cycle may be repeatedly performed.

Figure 4:
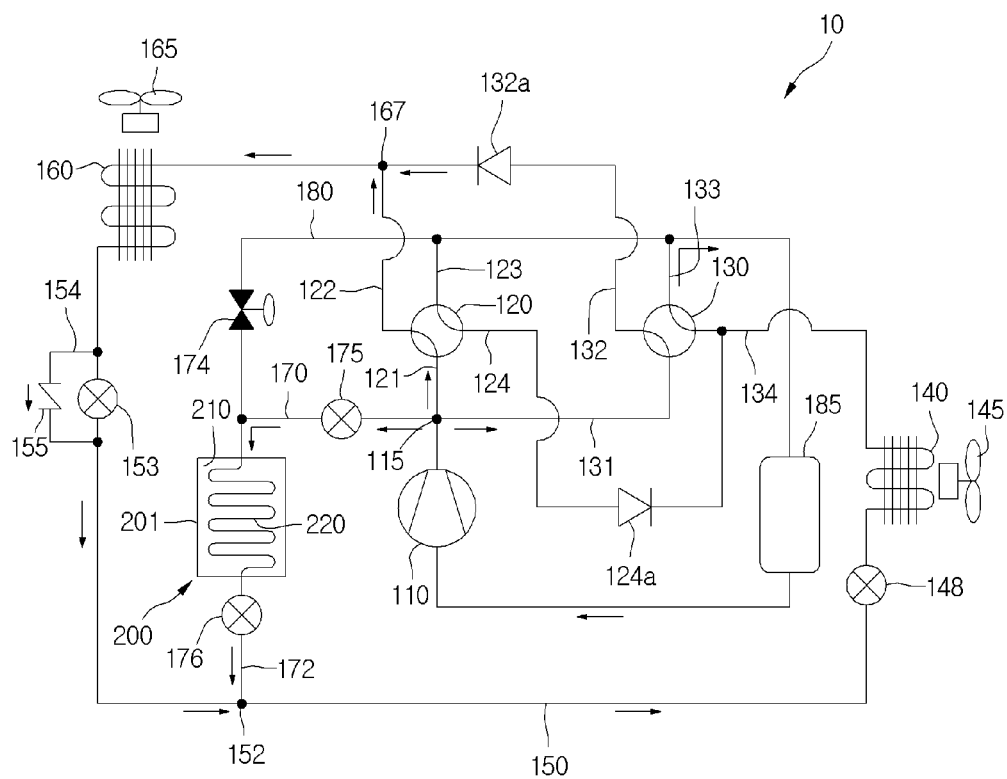
FIG. 4 is a system view illustrating a flow of the refrigerant when a heat radiation cooling operation of the regenerative air-conditioning apparatus is performed according to the first embodiment.

FIG. 4 is a system view illustrating a flow of the refrigerant when the heat radiation cooling operation of the regenerative air-conditioning apparatus is performed according to the first embodiment.

Referring to FIG. 4, the refrigerant compressed in the compressor 110 is divided to flow into the first storage bath connection tube 170 and the first and second valve devices 120 and 130 at the first branch part 115. Here, the first expansion device 175 is opened to guide a flow of the refrigerant from the first branch part 115 to the first storage bath connection tube 170.

The refrigerant introduced into the first connection tube 121 of the first valve device 120 is discharged into the second connection tube 122 of the first valve device 120, and the refrigerant introduced into the fifth connection tube 131 of the second valve device 130 is discharged into the sixth connection tube 132 of the second valve device 130.

The refrigerant of the second connection tube 122 and the refrigerant of the sixth connection tube 132 may be mixed with each other in the third branch part 167 and then be introduced into the outdoor heat exchanger 160 and be condensed in the outdoor heat exchanger 160.

The refrigerant condensed in the outdoor heat exchanger 160 flows into the condensed refrigerant tube 150. Here, the main expansion device 153 may be fully opened to allow the refrigerant to pass therethrough. Also, at least one portion of the refrigerant of the condensed refrigerant tube 150 may flow into the bypass tube 154 to bypass the main expansion device 153.

The second expansion device 176 may be open, and the flow rate adjustment valve 174 may be turned off or closed. Thus, a flow of the refrigerant of the first storage bath connection tube 170 into the low-pressure tube 180 may be restricted to flow into the heat storage bath 200.

The refrigerant introduced into the heat storage bath 200 may be condensed while exchanging heat with the thermal energy storage medium 210. Also, while the refrigerant is condensed, the thermal energy storage medium 210 may change in phase into a liquid state.

The refrigerant condensed in the heat storage bath 200 flows into the second storage bath connection tube 172 and then is mixed with the refrigerant of the condensed refrigerant tube 150 in the second branch part 152.

The refrigerant mixed in the second branch part 152 is decompressed in the indoor expansion device 148 and then is evaporated in the indoor heat exchanger 140.

That is, when the heat radiation cooling operation is performed, the outdoor heat exchanger 160 and the heat storage bath 200 function as the condenser, and the indoor heat exchanger 140 functions as the evaporator. Thus, the air-conditioning apparatus 10 may operate by using dual heat sources.

The refrigerant evaporated in the indoor heat exchanger 140 flows into the eighth connection tube 134 and then is introduced into the gas/liquid separator 185 through the seventh connection tube 133 of the second valve device 120. Also, a gaseous refrigerant of the refrigerant introduced into the gas/liquid separator 185 may be separated, and the separated gaseous refrigerant may be suctioned into the compressor 110. Then, the refrigerant cycle may be repeatedly performed.

Figure 5:
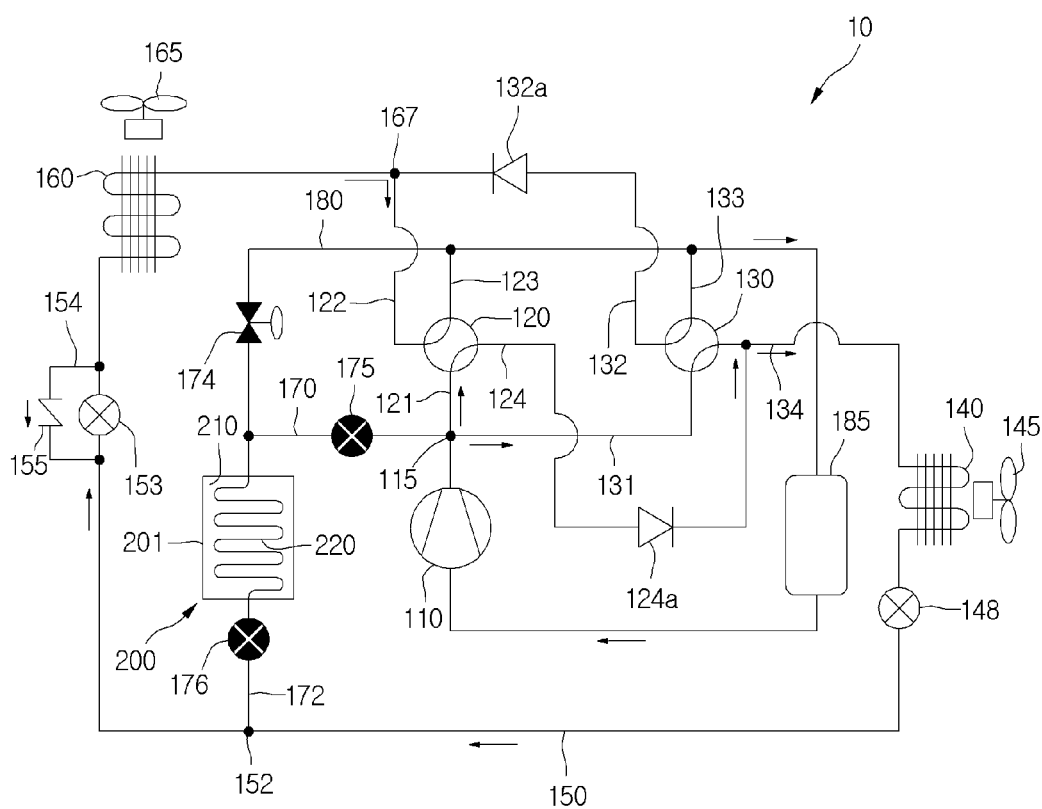
FIG. 5 is a system view illustrating a flow of the refrigerant when a normal heating operation of the regenerative air-conditioning apparatus is performed according to the first embodiment.

FIG. 5 is a system view illustrating a flow of the refrigerant when the normal heating operation of the regenerative air-conditioning apparatus is performed according to the first embodiment.

When the air-conditioning apparatus 10 performs a partial heating operation (a normal heating operation, a heat accumulation cooling operation, and a heat radiation heating operation), each of the first and second valve devices 120 and 130 may operate in a "second operation mode".

When the first valve device 120 operates in the second operation mode, the first and fourth connection tubes 121 and 124 communicate with each other, and the second and third connection tubes 122 and 123 communicate with each other.

Also, when the second valve device 130 operates in the second operation mode, the fifth connection tube 131 and the eighth connection tube 134 communicate with each other, and the sixth connection tube 132 and the seventh connection tube 133 communicate with each other.

On the other hand, when the air-conditioning apparatus 10 performs a different heating operation to be described later, i.e., the defrosting heating operation, the first valve device 120 operates as it would in the "first operation mode", and the second valve device 130 operates as it would in the "second operation mode". In such a defrost operation, the first and second valve devices 120 and 130 may operate in a "third operation mode".

Referring to FIG. 5, the refrigerant compressed in the compressor 110 is divided to flow into the first and second valve devices 120 and 130 at the first branch part 115. Here, the first expansion device 175 is closed to restrict a flow of the refrigerant from the first branch part 115 to the first storage bath connection tube 170.

That is, at least one portion of the compressed refrigerant is introduced into the first connection tube 121 of the first valve device 120 and then is discharged into the fourth connection tube 124 of the first valve device 120. Also, the remaining portion of the compressed refrigerant is introduced into the fifth connection tube 131 of the second valve device 130 and then is discharged into the eighth connection tube 134 of the second valve device 130.

The refrigerant of the fourth connection tube 124 may be mixed with the refrigerant of the eighth connection tube 134 and then introduced into the indoor heat exchanger 140 and condensed in the indoor heat exchanger 140.

The refrigerant condensed in the indoor heat exchanger 140 flows into the condensed refrigerant tube 150. Here, the indoor expansion device 148 may be fully opened to allow the refrigerant to pass therethrough.

Also, the second expansion device 176 is closed to restrict a flow of the refrigerant of the condensed refrigerant tube 150 into the second storage bath connection tube 172.

The refrigerant of the condensed refrigerant tube 150 passes through the main expansion device 153 and then is introduced into the outdoor heat exchanger 160 and evaporated. Here, the main expansion device 153 may be opened by a predetermined opening degree that is enough to decompress the refrigerant.

A flow of the refrigerant of the condensed refrigerant tube 150 into the bypass tube 154 may be restricted by the bypass check valve 155.

The refrigerant may be evaporated while passing through the outdoor heat exchanger 160, and the evaporated refrigerant may be introduced into the second connection tube 122 of the first valve device 120 via the third branch part 167 and then be discharged into the third connection tube 123. Here, a flow of the refrigerant into the sixth connection tube 132 may be restricted by the second check valve 132a.

The refrigerant discharged into the third connection tube 123 is introduced into the gas/liquid separator 185 through the low-pressure tube 180. A gaseous refrigerant of the refrigerant introduced into the gas/liquid separator 185 may be separated, and the separated gaseous refrigerant may be suctioned into the compressor 110. Then, the refrigerant cycle may be repeatedly performed.

Figure 6:
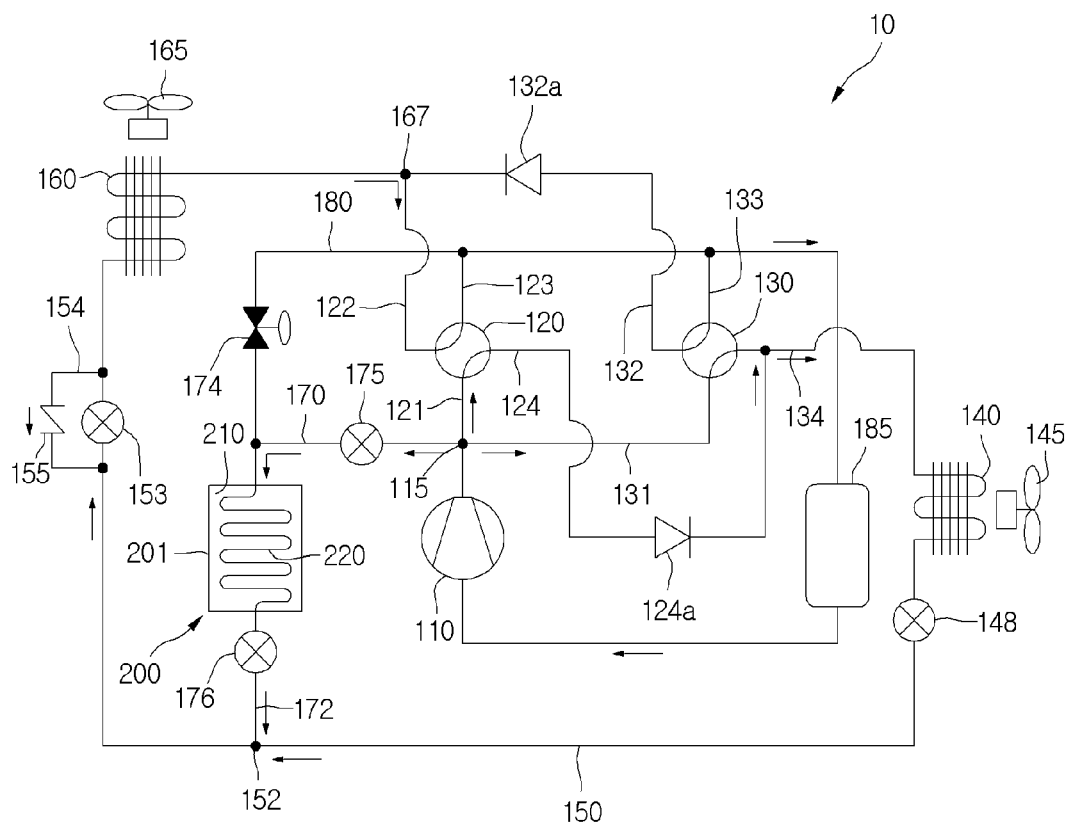
FIG. 6 is a system view illustrating a flow of the refrigerant when a heat accumulation heating operation of the regenerative air-conditioning apparatus is performed according to the first embodiment.

FIG. 6 is a system view illustrating a flow of the refrigerant when the heat accumulation heating operation of the regenerative air-conditioning apparatus is performed according to the first embodiment.

Referring to FIG. 6, the refrigerant compressed in the compressor 110 is divided to flow into the first storage bath connection tube 170 and the first and second valve devices 120 and 130 at the first branch part 115. Here, the first expansion device 175 is opened to guide a flow of the refrigerant from the first branch part 115 to the first storage bath connection tube 170.

The refrigerant introduced into the first connection tube 121 of the first valve device 120 is discharged into the fourth connection tube 124, and the refrigerant introduced into the fifth connection tube 131 of the second valve device 130 is discharged into the eighth connection tube 134.

The refrigerant of the fourth connection tube 124 may be mixed with the refrigerant of the eighth connection tube 134 and then introduced into the indoor heat exchanger 140 and condensed in the indoor heat exchanger 140.

The refrigerant condensed in the indoor heat exchanger 140 flows into the condensed refrigerant tube 150. Here, the indoor expansion device 148 may be fully opened to allow the refrigerant to pass therethrough.

The second expansion device 176 may be open, and the flow rate adjustment valve 174 may be turned off or closed. Thus, a flow of the refrigerant of the first storage bath connection tube 170 into the low-pressure tube 180 may be restricted to flow into the heat storage bath 200.

The refrigerant introduced into the heat storage bath 200 may be condensed while exchanging heat with the thermal energy storage medium 210. Also, while the refrigerant is condensed, the thermal energy storage medium 210 may change in phase into a liquid state to store heat.

The refrigerant condensed in the heat storage bath 200 flows into the second storage bath connection tube 172 and then is mixed with the refrigerant of the condensed refrigerant tube 150 in the second branch part 152.

The refrigerant mixed in the second branch part 152 is decompressed in the main expansion device 153 and then is evaporated in the outdoor heat exchanger 160. Here, a flow of the refrigerant into the bypass tube 154 is restricted by the bypass check valve 155.

That is, when the heat accumulation heating operation is performed, the indoor heat exchanger 140 and the heat storage bath 200 function as the condenser, and the outdoor heat exchanger 160 functions as the evaporator. Thus, the air-conditioning apparatus 10 may operate by using dual loads.

The refrigerant evaporated in the outdoor heat exchanger 160 is introduced into the second connection tube 122 of the first valve device 120 via the third branch part 167 and then is discharged into the third connection tube 123. Here, a flow of the refrigerant into the sixth connection tube 132 may be restricted by the second check valve 132a.

The refrigerant discharged into the third connection tube 123 is introduced into the gas/liquid separator 185 through the low-pressure tube 180. A gaseous refrigerant of the refrigerant introduced into the gas/liquid separator 185 may be separated, and the separated gaseous refrigerant may be suctioned into the compressor 110. Then, the refrigerant cycle may be repeatedly performed.

Figure 7:
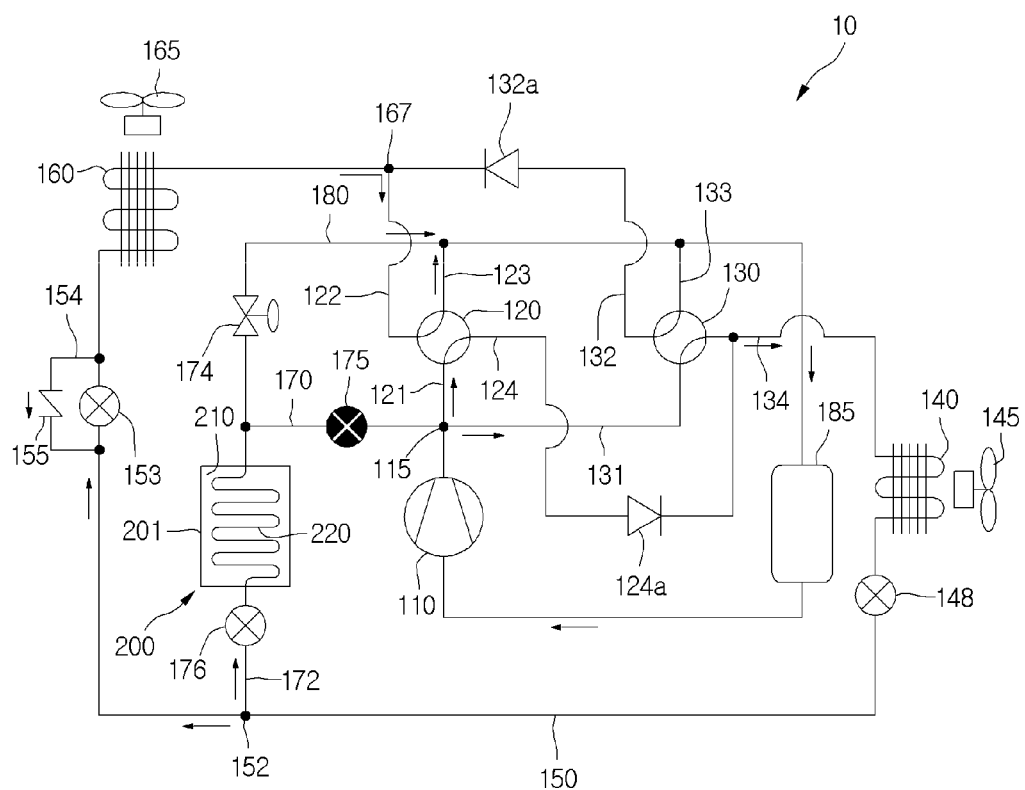
FIG. 7 is a system view illustrating a flow of the refrigerant when a heat radiation heating operation of the regenerative air-conditioning apparatus is performed according to the first embodiment.

FIG. 7 is a system view illustrating a flow of the refrigerant when the heat radiation heating operation of the regenerative air-conditioning apparatus is performed according to the first embodiment.

Referring to FIG. 7, the refrigerant compressed in the compressor 110 is divided to flow into the first and second valve devices 120 and 130 at the first branch part 115. Here, the first expansion device 175 is closed to restrict a flow of the refrigerant from the first branch part 115 to the first storage bath connection tube 170.

The refrigerant introduced into the first connection tube 121 of the first valve device 120 is discharged into the fourth connection tube 124, and the refrigerant introduced into the fifth connection tube 131 of the second valve device 130 is discharged into the eighth connection tube 134.

The refrigerant of the fourth connection tube 124 may be mixed with the refrigerant of the eighth connection tube 134 and then introduced into the indoor heat exchanger 140 and condensed in the indoor heat exchanger 140.

The refrigerant condensed in the indoor heat exchanger 140 flows into the condensed refrigerant tube 150. Here, the indoor expansion device 148 may be fully opened to allow the refrigerant to pass therethrough.

The second expansion device 176 is opened to guide at least one portion of the refrigerant of the condensed refrigerant tube 150 into the second storage bath connection tube 172. Here, the second expansion device 176 may be opened by a predetermined opening degree that is enough to decompress the refrigerant.

The refrigerant decompressed in the second expansion device 176 may be introduced into the heat storage bath 200 and then be evaporated while exchanging heat with the thermal energy storage medium 210. Also, while the refrigerant is evaporated, the thermal energy storage medium 210 may change in phase into a solid state.

The refrigerant of the condensed refrigerant tube 150 except for the refrigerant flowing into the second storage bath connection tube 172 is decompressed in the main expansion device 153 and is evaporated in the outdoor heat exchanger 160. Here, a flow of the refrigerant into the bypass tube 154 is restricted by the bypass check valve 155.

That is, when the heat radiation heating operation is performed, the indoor heat exchanger 140 functions as the condenser, and the heat storage bath 200 and the outdoor heat exchanger 140 function as the evaporator. Thus, the air-conditioning apparatus 10 may operate by using dual heat sources.

The refrigerant evaporated in the heat storage bath 200 is introduced into the gas/liquid separator 185 via the low-pressure tube 180. Here, the flow rate adjustment valve 174 is turned on or opened to guide a flow of the refrigerant into the low-pressure tube 180.

The refrigerant evaporated in the outdoor heat exchanger 160 is introduced into the second connection tube 122 of the first valve device 120 via the third branch part 167 and then is discharged into the third connection tube 123. Here, a flow of the refrigerant into the sixth connection tube 132 may be restricted by the second check valve 132a.

The refrigerant discharged into the third connection tube 123 is introduced into the gas/liquid separator 185 through the low-pressure tube 180. A gaseous refrigerant of the refrigerant introduced into the gas/liquid separator 185 may be separated, and the separated gaseous refrigerant may be suctioned into the compressor 110. Then, the refrigerant cycle may be repeatedly performed.

Figure 8:
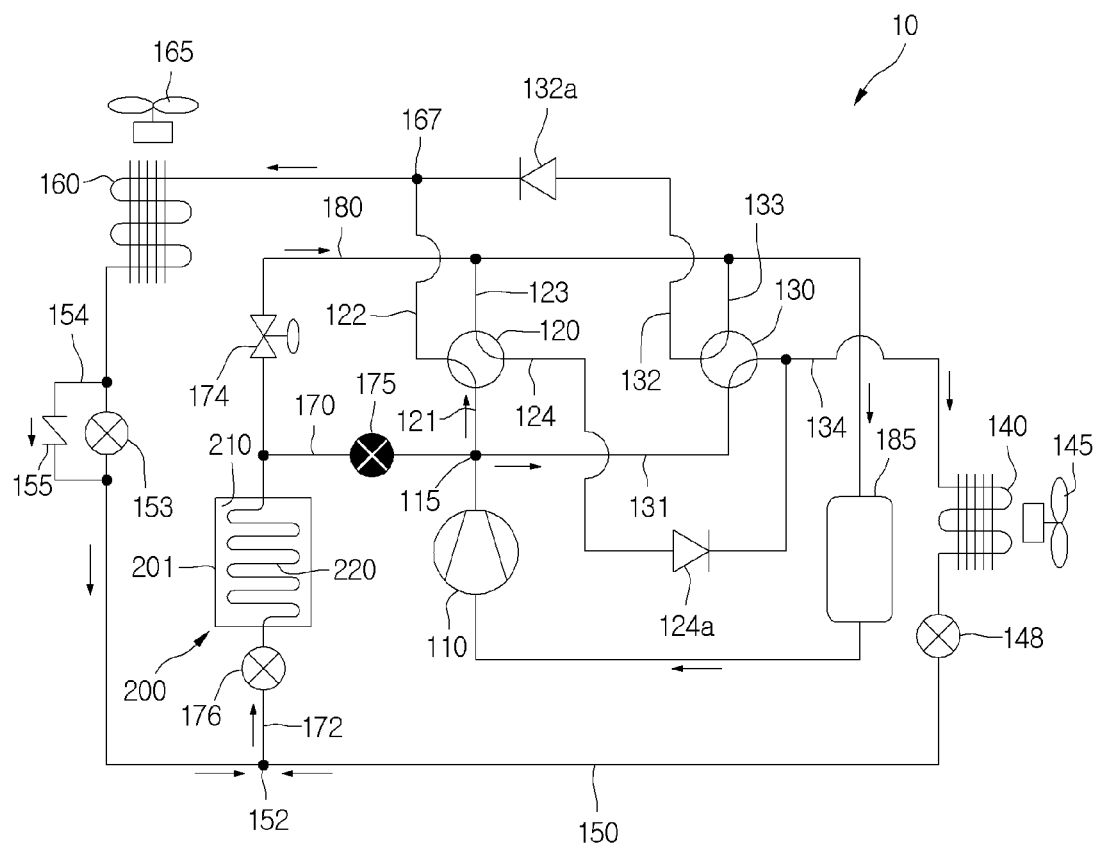
FIG. 8 is a system view illustrating a flow of the refrigerant when a defrosting heating operation of the regenerative air-conditioning apparatus is performed according to the first embodiment.

FIG. 8 is a system view illustrating a flow of the refrigerant when a defrosting heating operation of the regenerative air-conditioning apparatus is performed according to the first embodiment.

Referring to FIG. 8, the refrigerant compressed in the compressor 110 is divided to flow into the first and second valve devices 120 and 130 at the first branch part 115. Here, the first expansion device 175 is closed to restrict a flow of the refrigerant from the first branch part 115 to the first storage bath connection tube 170.

The refrigerant introduced into the first connection tube 121 of the first valve device 120 is discharged into the second connection tube 122, and the refrigerant introduced into the fifth connection tube 131 of the second valve device 130 is discharged into the eighth connection tube 134.

The refrigerant of the second connection tube 122 may be introduced into the outdoor heat exchanger 160 via the third branch part 167 and then is condensed in the outdoor heat exchanger 160. Also, the refrigerant of the eighth connection tube 134 is introduced into the indoor heat exchanger 140 and then is condensed in the indoor heat exchanger 140.

While the refrigerant is condensed in the outdoor heat exchanger 160, frost attached on the outdoor heat exchanger 160 may be removed. The refrigerant condensed in the outdoor heat exchanger 160 flows into the condensed refrigerant tube 150. Here, the main expansion device 153 may be fully opened to allow the refrigerant to pass therethrough. Also, at least one portion of the refrigerant of the condensed refrigerant tube 150 may flow into the bypass tube 154.

The refrigerant condensed in the indoor heat exchanger 140 flows into the condensed refrigerant tube 150. Here, the indoor expansion device 148 may be fully opened to allow the refrigerant to pass therethrough.

The refrigerant condensed in the outdoor heat exchanger 160 and the indoor heat exchanger 140 are mixed with each other in the second branch part 152, and then the mixed refrigerant is introduced into the heat storage bath 200. Here, the second expansion device 176 may be opened by a predetermined opening degree that is enough to decompress the refrigerant, and thus, the refrigerant is decompressed in the second expansion device 176 and is introduced into the heat storage bath 200.

The refrigerant introduced into the heat storage bath 200 may be evaporated while exchanging heat with the thermal energy storage medium 210. Also, while the refrigerant is evaporated, the thermal energy storage medium 210 may change in phase into a solid state.

That is, when the defrosting heating operation is performed, the indoor heat exchanger 140 and the outdoor heat exchanger 160 function as the condenser, and the heat storage bath 200 functions as the evaporator. Thus, the air-conditioning apparatus 10 operates to perform the defrosting operation of the outdoor heat exchanger 160.

The refrigerant evaporated in the heat storage bath 200 is introduced into the gas/liquid separator 185 via the low-pressure tube 180. Here, the flow rate adjustment valve 174 is turned on or opened to guide a flow of the refrigerant into the low-pressure tube 180.

Also, the refrigerant of the low-pressure tube 180 may be introduced into the gas/liquid separator 185 to separate a gaseous refrigerant, and the separated gaseous refrigerant may be suctioned into the compressor 110. Then, the refrigerant cycle may be repeatedly performed.

As described above, according to the operation mode of the air-conditioning apparatus, the air-conditioning apparatus may operate by using the dual loads or heat sources. Also, when the heat operation is performed, the defrosting operation may be performed.

Hereinafter, a method for controlling the air-conditioning apparatus according to the current embodiment will be described.

Figure 9:
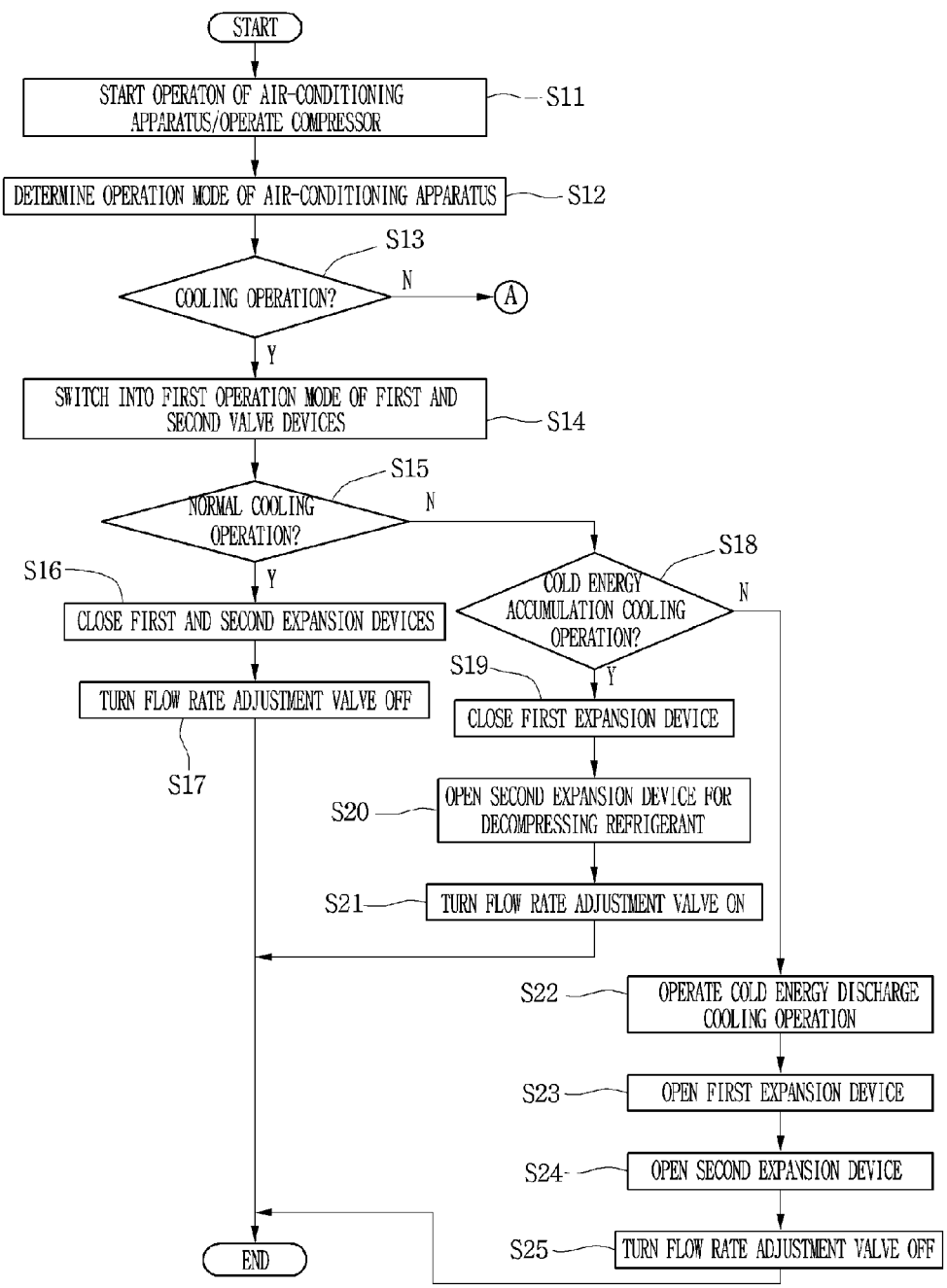
FIGS. 9 and 10 are flowcharts illustrating a method of controlling the regenerative air-conditioning apparatus according to the first embodiment.
Figure 10:
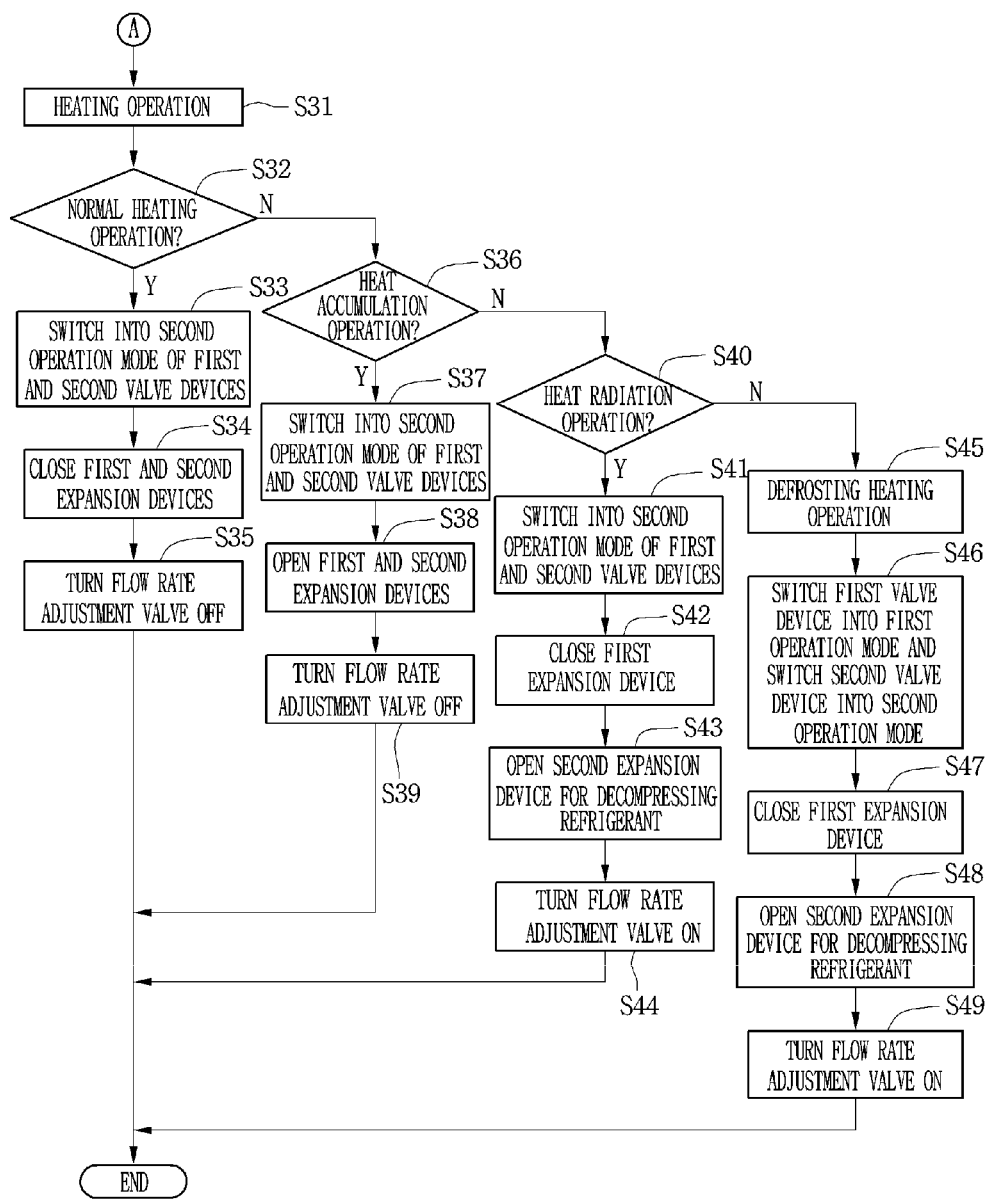

FIGS. 9 and 10 are flowcharts illustrating a method of controlling the regenerative air-conditioning apparatus according to the first embodiment.

Referring to FIGS. 9 and 10, when an air-conditioning apparatus 10 operates to drive a compressor 110, an operation mode of the air-conditioning apparatus 10 is determined in operations S11 and S12.

When the air-conditioning apparatus 10 operates in a cooling operation mode, first and second valve devices 120 and 130 are switched into a first operation mode. In operations S13 and S14, whether the air-conditioning apparatus 10 operates in a normal cooling operation mode is determined.

When the air-conditioning apparatus 10 operates in the normal cooling operation mode, first and second expansion devices 175 and 176 are closed.

Thus, in operations S15 and S16, a flow of the refrigerant into first and second storage bath connection tubes 170 and 172 is restricted to prevent the refrigerant from being introduced into the heat storage bath 200.

In operation S17, a flow rate adjustment valve 174 is turned off, and the refrigerant does not flow into a low-pressure tube 180.

On the other hand, in operations S18, and S19, when it is determined that a cold energy accumulation cooling is performed in the operation S15, the first expansion device 175 is closed to restrict a flow of the refrigerant into the first storage bath connection tube 170.

In operations S20 and S21, the second expansion device 176 is opened by a predetermined opening degree that is enough to decompress the refrigerant to introduce the refrigerant into the heat storage bath 200 after decompressing the refrigerant, and then the flow rate adjustment valve 174 is turned on to allow the refrigerant evaporated in the heat storage bath 200 to flow into a low-pressure tube 180.

When it is determined that a cold energy discharge cooling operation is performed in the operation S15, the first and second expansion devices 175 and 176 are opened to allow at least one portion of the refrigerant compressed in the compressor 110 to flow into the first and second storage bath connection tubes 170 and 172, In this process, in operations S22, S23, and S24, the refrigerant may be condensed within the heat storage bath 200.

Also, in operation S25, the flow rate adjustment valve 174 is turned off to restrict a flow of the refrigerant of the first storage bath connection tube 170 into the low-pressure tube 180.

When it is determined that the air-conditioning apparatus 10 operates in the heating operation mode S31 in the operation S13, whether the operation mode is the normal heating operation mode is determined.

When it is determined that the normal heating operation mode is performed, the first and second valve devices 120 and 130 are switched into the second operation mode in operation S33. Also, the first and second expansion devices 175 and 176 are closed. Thus, in operation S34, a flow of the refrigerant into first and second storage bath connection tubes 170 and 172 is restricted to prevent the refrigerant from being introduced into the heat storage bath 200.

In operation S35, a flow rate adjustment valve 174 is turned off, and the refrigerant does not flow into a low-pressure tube 180.

When it is determined that the air-conditioning apparatus 10 operates in the heat accumulation heating operation mode in the operation S32, the first and second valve devices 120 and 130 are switched into the second operation mode in operations S36 and S37. The first and second expansion devices 175 and 176 are opened to allow at least one portion of the refrigerant compressed in the compressor 110 to flow into the first and second storage bath connection tubes 170 and 172. In this process, in operation S38, the refrigerant may be condensed within the heat storage bath 200.

In operation S39, the flow rate adjustment valve 174 is turned off, and the refrigerant does not flow into a low-pressure tube 180.

When it is determined that the air-conditioning apparatus 10 operates in the heat radiation heating operation mode in the operation S36, the first and second valve devices 120 and 130 are switched into the second operation mode in operations S40 and S41.

In operation S42, the first expansion device 175 is closed to restrict a flow of the refrigerant into the first storage bath connection tube 170.

In operations S43 and S44, the second expansion device 176 is opened by a predetermined opening degree that is enough to decompress the refrigerant to introduce the refrigerant into the heat storage bath 200 after decompressing the refrigerant, and then the flow rate adjustment valve 174 is turned on to allow the refrigerant evaporated in the heat storage bath 200 to flow into a low-pressure tube 180.

When it is determined that the air-conditioning apparatus 10 operates in a defrosting heating operation mode in the operation S40, the first valve device 120 is switched into the first operation mode, and the second valve device 130 is switched into the second operation mode in operation S45 and S46.

In operation S47, the first expansion device 175 is closed to restrict a flow of the refrigerant into the first storage bath connection tube 170.

In operations S48 and S49, the second expansion device 176 is opened by a predetermined opening degree that is enough to decompress the refrigerant to introduce the refrigerant into the heat storage bath 200 after decompressing the refrigerant, and then the flow rate adjustment valve 174 is turned on to allow the refrigerant evaporated in the heat storage bath 200 to flow into a low-pressure tube 180.

Hereinafter, descriptions will be made according to a second embodiment. Since the present embodiment is the same as the first embodiment except for portions of the constitutions, different parts between the first and second embodiments will be described principally, and descriptions of the same parts will be denoted by the same reference numerals and descriptions of the first embodiment.

Figure 11:
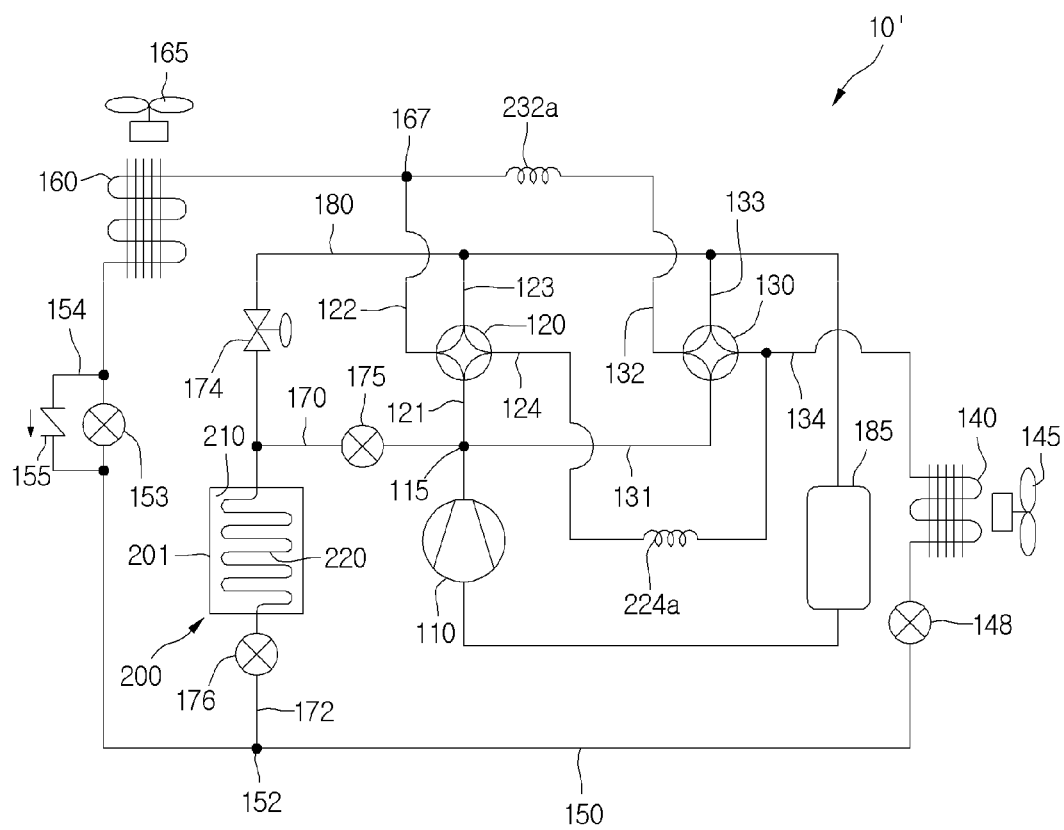
FIG. 11 is a system view of a regenerative air-conditioning apparatus according to a second embodiment.

FIG. 11 is a system view of a regenerative air-conditioning apparatus according to a second embodiment.

Referring to FIG. 11, a regenerative air-conditioning apparatus 10' according to a second embodiment includes a first capillary 224a disposed in a fourth connection tube 124 and a second capillary 232a disposed in a sixth connection tube 132.

The first capillary 224a may guide one-directional flow of a refrigerant in the fourth connection tube 124, i.e., a flow from a first valve device 120 to an eighth connection tube 134 and restrict an opposite flow of the refrigerant, i.e., a flow from the eighth connection tube 134 to the second valve device 130.

The second capillary 232a may guide one-directional flow of the refrigerant in the sixth connection tube 132, i.e., a flow from a second valve device 130 to a third branch part 167 and restrict an opposite flow of the refrigerant, i.e., a flow from the third branch part 167 to the second valve device 130.

The check valves 124a and 132a according to the first embodiment and the capillaries 224a and 232a according to the second embodiment may be called a "backflow prevention device" in that they guide the one-directional flow of the refrigerant to prevent the refrigerant from flowing backward.

According to the embodiments, the heat (or the cool) energy may be stored in the heat accumulation bath (or the cold energy accumulation bath), and then the refrigeration cycle may operate by using the heat or cold energy stored in the heat accumulation bath. Particularly, the dual heat source/dual load type air-conditioning apparatus using the heat accumulation bath may be provided to improve the operation efficiency and reduce the power consumption in the air-conditioning apparatus.

In detail, when the heat accumulation heating operation is performed, the indoor heat exchanger and the heat accumulation bath may function as the condenser to realize the air-conditioning apparatus using the dual loads. Also, when the heat radiation heating operation is performed, the outdoor heat exchanger and the heat accumulation bath may function as the evaporator to realize the air-conditioning apparatus using the dual heat sources. Also, when the defrosting operation is performed, the outdoor heat exchanger and the indoor heat exchanger may function as the condenser to easily perform the defrosting operation for the outdoor heat exchanger.

Also, when the heat accumulation cooling operation is performed, the indoor heat exchanger and the heat accumulation bath may function as the evaporator to realize the air-conditioning apparatus using the dual loads. Also, when the heat radiation cooling operation is performed, the outdoor heat exchanger and the heat accumulation bath may function as the condenser to realize the air-conditioning apparatus using the dual heat sources.

Also, the slurry of tetra n-butyl ammonium bromide, $[(CH_3(CH_2)_3]_4NBr$ (TBAB) that is a phase change material may be used as the heat accumulation material to generate the phase change temperature that is greater than that of water, thereby improving the function of the heat accumulation bath.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A regenerative air-conditioning apparatus including a compressor, an outdoor heat exchanger, an indoor heat exchanger, and a thermal energy storage unit, the regenerative air-conditioning apparatus comprising:
    a first valve device for switching a flow direction of refrigerant compressed in the compressor;
    a second valve device for switching a flow direction of refrigerant compressed in the compressor;
    a first branch part disposed on an outlet-side of the compressor, the first branch part dividing refrigerant compressed in the compressor to flow toward the first valve device, the second valve device, and the thermal energy storage unit;
    a first storage unit connection tube extending from the first branch part to the thermal energy storage unit;
    a condensed refrigerant tube extending from the outdoor heat exchanger to the indoor heat exchanger;
    a second storage unit connection tube extending from the thermal energy storage unit to the condensed refrigerant tube; and
    a first expansion device disposed in the first storage unit connection tube to selectively restrict a flow of refrigerant from the first branch part to the thermal energy storage unit.

2. The regenerative air-conditioning apparatus according to claim 1, further comprising a second expansion device disposed in the second storage unit connection tube to selectively restrict a flow of refrigerant into the thermal energy storage unit or a flow of refrigerant discharged from the thermal energy storage unit.

3. The regenerative air-conditioning apparatus according to claim 2, wherein at least one of the first expansion device and the second expansion device comprises an electronic expansion valve.

4. The regenerative air-conditioning apparatus according to claim 1, further comprising:
    a low-pressure tube extending from the first storage unit connection tube to a suction-side of the compressor to allow evaporated refrigerant to flow therethrough; and
    a flow rate adjustment valve disposed in the low-pressure tube to selectively restrict a flow of refrigerant in the low-pressure tube.

5. The regenerative air-conditioning apparatus according to claim 4, further comprising:
    a first connection tube extending from the first valve device and configured to guide refrigerant compressed in the compressor into the first valve device;
    a second connection tube extending from the first valve device and configured to guide refrigerant introduced into the first valve device through the first connection tube into the outdoor heat exchanger when a cooling operation is performed;
    a third connection tube extending from the first valve device to the low-pressure tube; and
    a fourth connection tube extending from the first valve device and configured to guide refrigerant introduced into the first valve device into the indoor heat exchanger.

6. The regenerative air-conditioning apparatus according to claim 5, further comprising:
    a fifth connection tube extending from the second valve device and configured to guide refrigerant compressed in the compressor into the second valve device;
    a sixth connection tube extending from the second valve device and configured to guide refrigerant introduced into the second valve device through the fifth connection tube into the outdoor heat exchanger when the cooling operation is performed;
    a seventh connection tube extending from the second valve device to the low-pressure tube; and an eighth connection tube extending from the second valve device and configured to guide refrigerant introduced into the second valve into the indoor heat exchanger.

7. The regenerative air-conditioning apparatus according to claim 6, further comprising a third branch part at which the second connection tube and the sixth connection tube are combined with each other.

8. The regenerative air-conditioning apparatus according to claim 6, wherein the fourth connection tube and the eighth connection tube are connected at a connection point.

9. The regenerative air-conditioning apparatus according to claim 1, wherein the thermal energy storage unit comprises:
- a case defining an exterior;
- an inner tube disposed within the case to allow the refrigerant to flow therethrough; and
- a thermal energy storage medium disposed within the case.

10. The regenerative air-conditioning apparatus according to claim 9, wherein the thermal energy storage medium comprises a phase change material containing a solution of tetra n-butyl ammonium bromide [(CH3(CH2)3]4NBr (TBAB).

11. The regenerative air-conditioning apparatus according to claim 1, further comprising a second branch part at which the second storage unit connection tube and the condensed refrigerant tube are combined with each other.

12. The regenerative air-conditioning apparatus according to claim 1, wherein at least one of the first valve device and the second valve device comprises a four-way valve.

13. A regenerative air-conditioning apparatus including a compressor, an outdoor heat exchanger, an indoor heat exchanger, and a thermal energy storage unit, the regenerative air-conditioning apparatus comprising:
- a first valve device for switching a flow direction of refrigerant compressed in the compressor;
- a second valve device for switching a flow direction of refrigerant compressed in the compressor;
- a first branch part disposed on an outlet-side of the compressor, the first branch part dividing refrigerant compressed in the compressor to flow toward the first valve device, the second valve device, and the thermal energy storage unit;
- a first storage unit connection tube extending from the first branch part to the thermal energy storage unit;
- a condensed refrigerant tube extending from the outdoor heat exchanger to the indoor heat exchanger;
- a second storage unit connection tube extending from the thermal energy storage unit to the condensed refrigerant tube;
- a low-pressure tube extending from the first storage unit connection tube to a suction-side of the compressor to allow evaporated refrigerant to flow therethrough;
- a first connection tube extending from the first valve device and configured to guide refrigerant compressed in the compressor into the first valve device;
- a second connection tube extending from the first valve device and configured to guide refrigerant introduced into the first valve device through the first connection tube into the outdoor heat exchanger when a cooling operation is performed;
- a third connection tube extending from the first valve device to the low-pressure tube; and
- a fourth connection tube extending from the first valve device and configured to guide refrigerant introduced into the first valve device into the indoor heat exchanger.

* * * * *